(12) United States Patent
Campbell et al.

(10) Patent No.: US 8,870,057 B2
(45) Date of Patent: Oct. 28, 2014

(54) SYSTEM AND METHOD FOR EQUIPMENT MONITORING COMPONENT CONFIGURATION

(75) Inventors: Lam Arthur Campbell, Minden, NV (US); Sherrie Ann Clark, Minden, NV (US); Raymond Verle Jensen, Gardnerville, NV (US); Charles Terrance Hatch, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 36 days.

(21) Appl. No.: 13/240,544

(22) Filed: Sep. 22, 2011

(65) Prior Publication Data

US 2013/0075463 A1    Mar. 28, 2013

(51) Int. Cl.
*G06K 7/00* (2006.01)
*G05B 23/02* (2006.01)

(52) U.S. Cl.
CPC ................................. *G05B 23/0216* (2013.01)
USPC ........... 235/375; 235/435; 235/439; 235/487; 235/492

(58) Field of Classification Search
USPC ......... 235/435, 439, 440, 451, 454, 462, 487, 235/492; 340/10, 572
See application file for complete search history.

(56) References Cited

U.S. PATENT DOCUMENTS

| | | | |
|---|---|---|---|
| 6,843,628 B1 * | 1/2005 | Hoffmeister et al. | ............ 411/14 |
| 7,113,873 B2 | 9/2006 | Hoyte et al. | |
| 7,317,994 B2 | 1/2008 | Iyer et al. | |
| 7,325,455 B2 | 2/2008 | Campbell et al. | |
| 7,437,255 B2 | 10/2008 | Woodmansee et al. | |
| 7,455,224 B2 * | 11/2008 | Kochevar et al. | ............. 235/382 |
| 7,516,679 B2 | 4/2009 | Bell et al. | |
| 7,653,446 B2 | 1/2010 | Philyaw | |
| 7,693,212 B2 | 4/2010 | Petchenev et al. | |
| 7,808,233 B2 | 10/2010 | Jensen | |
| 7,818,139 B2 | 10/2010 | Jensen | |
| 7,908,467 B2 | 3/2011 | Philyaw | |
| 7,970,556 B2 | 6/2011 | Hala et al. | |
| 2005/0011957 A1 * | 1/2005 | Attia et al. | ............... 235/462.46 |
| 2005/0187783 A1 * | 8/2005 | Johnston et al. | ................... 705/1 |
| 2010/0089159 A1 | 4/2010 | Younsi et al. | |
| 2010/0097079 A1 | 4/2010 | Sheikman et al. | |
| 2010/0097220 A1 * | 4/2010 | Cheng | ........................ 340/572.1 |
| 2010/0256927 A1 | 10/2010 | Hala et al. | |
| 2011/0049883 A1 | 3/2011 | Hatch et al. | |
| 2011/0049900 A1 | 3/2011 | Jensen | |

FOREIGN PATENT DOCUMENTS

EP        0194333       9/1986

* cited by examiner

*Primary Examiner* — Matthew Mikels
(74) *Attorney, Agent, or Firm* — Hiscock & Barclay LLP

(57) ABSTRACT

A system and method for configuring a communications interface between a monitoring apparatus and one or more equipment monitoring components is disclosed. The equipment monitoring components are designed to physically and/or electrically interface with each other while in proximity to equipment being monitored. Each of these components has a proximately disposed unique associated machine readable code. A set of configuration information is also associated with the machine readable code. The codes are scanned and mapped to the configuration information in order to automate configuration of communication between the monitoring apparatus and equipment monitoring components.

22 Claims, 4 Drawing Sheets

Fig. 4

SYSTEM AND METHOD FOR EQUIPMENT MONITORING COMPONENT CONFIGURATION

BACKGROUND OF THE INVENTION

The subject matter disclosed herein relates to configuring equipment monitoring components.

Industrial plants are designed to employ various types of components for monitoring the operation of other equipment within the plant. These components may be physically and/or electrically attached with each other and may have a communication interface with a remotely located monitoring apparatus. Such a communication interface is typically required to be configured for proper and accurate operation of the monitoring apparatus. The typical procedure for configuring such a communications interface can be time consuming and vulnerable to inaccuracy.

In a typical system, a user walks to within viewing proximity of the equipment (e.g., a turbine) and then identifies characteristics and external markings that are visible on each monitoring component, such as the type, manufacture and model of each component, and then records such information, such as for example, via a writing on a notepad, and then walks over to the monitoring apparatus, which might be located 200 yards away from the equipment. The user then interacts with a user interface provided by the monitoring apparatus and communicates information to the monitoring apparatus typically via a keyboard and/or a mouse, that represents the characteristics of each component, such as for example, the type, manufacture and model of each component. Any information that may be required to be entered into the user interface of the monitoring apparatus may have been recorded inaccurately or not at all by the user. As a result, the configuration information that directs the operation of the monitoring apparatus for communicating with the equipment monitoring components may be inaccurate and/or incomplete. The user may or may not recognize that the entered configuration information is inaccurate or incomplete.

If such a configuration problem is recognized by the user, the user will likely travel (e.g., walk) back to the equipment and attempt to again record any information understood to be relevant to configuring the installed set of equipment monitoring components and then travel back to the monitoring apparatus to re-enter such information via the user interface program. If such a configuration problem is not recognized by the user, the user will cease attempting to properly configure the monitoring apparatus and as a result, the monitoring apparatus will be permitted to operate while being directed by incomplete and/or inaccurate configuration information, potentially causing incorrect processing of signals received from the equipment monitoring components.

The discussion above is merely provided for general background information and is not intended to be used as an aid in determining the scope of the claimed subject matter.

BRIEF DESCRIPTION OF THE INVENTION

A system and method for configuring a communications interface between a monitoring apparatus and one or more equipment monitoring components is disclosed. The equipment monitoring components are designed to physically and/or electrically interface with each other while in proximity to equipment being monitored. Each of these components has a proximately disposed unique associated machine readable code. A set of configuration information is also associated with the machine readable code. The codes are scanned and mapped to the configuration information in order to automate configuration of communication between the monitoring apparatus and equipment monitoring components.

An advantage that may be realized in the practice of some disclosed embodiments is reduced expenditure of time and improved accuracy when configuring a communications interface between a monitoring apparatus and one or more equipment monitoring components.

In one exemplary embodiment, a system is disclosed for configuring a communications interface between a monitoring apparatus and one or more components that are designed to physically and/or electrically interface with each other, one or more of the components each having a unique associated machine readable code and each component having associated configuration information, the system including a code scanning device that is configured to input and map a visual representation of a machine readable code associated with each of one or more selected components, to at least one numerical value, a code mapping facilitator that is configured to map the at least one numerical value to an associated set of configuration information, and a monitoring configuration facilitator that is configured to communicate the set of configuration information to a monitoring apparatus that is designed to communicate with the at least one component of the one or more selected components.

In another exemplary embodiment, there is provided a method for configuring a communications interface with one or more equipment monitoring components that are designed to physically and/or electrically interface with each other, one or more of the components each having a unique associated machine readable code and each having associated configuration information associated with the machine readable code. The method includes the steps of scanning a representation of a machine readable code that is associated with at least one of the components, obtaining at least a portion of a set of configuration information that is associated with the machine readable code, and communicating the set of configuration information to a monitoring apparatus that is designed to communicate with the at least one component.

In another exemplary embodiment, the invention provides for a method of configuring a communications interface with one or more equipment monitoring components that are designed to physically and/or electrically interface with each other, each of the components having a unique associated machine readable code and each having associated configuration information associated with the machine readable code, the method including the steps of scanning a representation of a machine readable code that is associated with at least one of the components via a code scanning device, the components collectively function as a sensor for monitoring selected equipment, obtaining a set of configuration information that is associated with the machine readable code via communication with a repository of configuration information, and communicating the set of configuration information to a monitoring apparatus that is designed to communicate with the at least one of the components while monitoring the selected equipment.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

Figure 1:
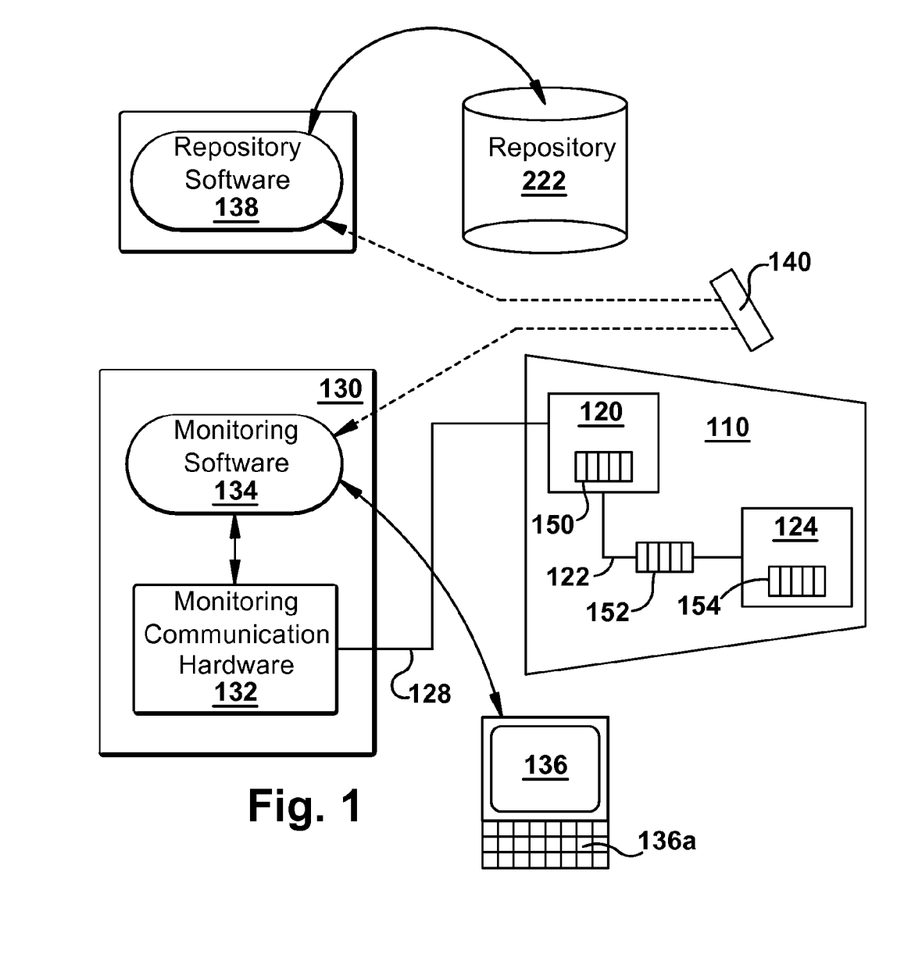
FIG. 1 is a diagram illustrating an embodiment of a system including a monitoring apparatus for monitoring the operation, condition or health of industrial plant equipment.

FIG. 1 is a diagram illustrating an exemplary embodiment of a system 100 for monitoring the operation of industrial plant equipment, such as a turbine 110. As shown, a set of equipment monitoring components 120-124, typically including sensors, electronics and transducers, are designed for interfacing with each other for the purpose of monitoring the operation of selected equipment, such as the turbine 110, and are shown disposed along an outer surface of a turbine 110. Generally, such components are disposed proximate to, adjacent or inside of a particular unit of industrial plant equipment. In this exemplary embodiment, a cable 128 provides an electrical connection, between at least one of the equipment monitoring components 120-124 and a monitoring apparatus 130.

As shown, machine readable codes 150-154 are each respectively attached to each respective component 120-124. Machine readable code 150 is attached to component 120, machine readable code 152 is attached to component 122 and machine readable code 154 is attached to component 124. Machine readable codes display a pattern that is designed to encode information that can be decoded by a code scanning device 140. There are numerous types of machine readable codes, which are also referred to as bar codes, QR codes, optical product marking etc. A machine readable code can also be designed to be human readable, such for example, a product code including letters or numbers, and is not necessarily not suitable to be read via the human eye. The monitoring apparatus 130 includes computer hardware and software and is designed to receive and process electronic signals that are transmitted from the equipment monitoring components 120-124.

The attributes of each of these equipment monitoring components 120-124, such as the type, manufacturer, model and operating characteristics of each of these components 120 can vary. As a result, the correct processing by the monitoring apparatus 130 of signals received from the equipment monitoring components 120-124, requires that certain configuration parameters that define the attributes, such as operating characteristics of the equipment monitoring components 120-124 and/or mechanical configuration of the equipment, be included within configuration information that is stored and processed within the monitoring apparatus 130. Furthermore, configuration parameters that define the attributes and operating characteristics of the monitoring apparatus itself, may also be included within the configuration information.

The monitoring apparatus 130 includes monitoring communication hardware 132 and monitoring software 134. The monitoring software 134 is designed to input and process configuration information, packaged in the form of a configuration file, that provides information to direct the processing of signals received by the monitoring apparatus 130 from cable 128. In some exemplary embodiments, such as for example, including supplied monitoring systems from the General Electric Company of Bently Nev., the configuration file is referred to as a (.rak) file.

In the exemplary embodiment shown, the monitoring software 134 also includes an user interface program that is designed to interact with a user via a user interface hardware 136 including a visual display, keyboard and pointing device (mouse) via the user interface hardware 136, a user can view configuration parameter names and associated parameter values of those named parameters, and further modify a parameter value that is associated with each parameter name.

A code scanning device 140, also referred to as an image capture device, is disposed in proximity to the set of equipment monitoring components 120-124 and is employed to capture, also referred to as scanning, a digital image of each equipment monitoring component 120-124. Application software is employed within the code scanning device 140 having a technical effect to scan and identify a representation of a machine readable code 150-154 (See FIG. 3) that is displayed within the image of each equipment monitoring component 120-124. As a further technical effect, the software maps the code to obtain a set of configuration information that is associated with the code and communicates the configuration information to the monitoring apparatus 130 that is designed to communicate with the associated equipment monitoring component 120-124. The scanning device 140 is designed for initiating bi-directional wireless communication to the monitoring apparatus 130 and/or the computer 136 in accordance with IEEE 802.11, Bluetooth, or other wireless communication standards.

While using the code scanning device 140, the user can obtain other types of configuration information, such as including orientation and location of an equipment monitoring component 120-124, that cannot be obtained from scanning any code that is disposed in association with the equipment monitoring component 120-124.

In some embodiments, the code scanning device 140 includes hardware, such as for example an accelerometer and/or a gyroscope, that are designed to measure a direction of gravity relative to and the orientation of, the code scanning device 140. In combination with other capabilities of the code scanning device 140, including such as the execution of embedded digital logic and image capture and viewing capabilities of the code scanning device 140, the orientation of the code scanning device 140 relative to the direction of gravity can be determined via the code scanning device 140. This is particularly useful when configuring the orientation of a probe that is functioning as an equipment monitoring component 120-124. In some circumstances, the probe may need to be oriented at a particular angle relative to the direction of gravity.

While viewing an equipment monitoring component 120-124 via the code scanning device 140, the orientation of an equipment monitoring component 120-124 that is disposed in proximity to the code scanning device 140 can be determined. The orientation of an equipment monitoring component 120-124 can be measured relative to the direction of gravity and/or relative to the orientation of the code scanning device 140 while the equipment monitoring component 120-124 is being viewed through the code scanning device 140.

In some embodiments, the code scanning device 140 is placed into a mode that provides an orientation angle measurement template, having a general appearance of a circular clock that instead indicates angle of orientation numerals along its perimeter, and that is superimposed over the image of an equipment monitoring component 120-124 while the equipment monitoring component 120-124 is being viewed through a user interface display screen 140a of the code scanning device 140. This feature enables a user of the code scanning device 140 to view and measure angle of orientation of the equipment monitoring component 140, while the code scanning device 140 is oriented in alignment with the direction of gravity. As a result, the orientation of an equipment monitoring component 120-124 can be measured and adjusted with respect to the direction of gravity while viewing the equipment monitoring component 120-124 via the image viewing and angle of orientation measurement features of the code scanning device 140.

In some embodiments, the code scanning device 140 includes hardware, such as for example a geographic positioning system (GPS) component, that is designed to measure and report the location of the code scanning device 140. The location of equipment monitoring components 120-124 can be determined when the code scanning device 140 is located proximate or adjacent to the location of an equipment monitoring component 120-124. As a result, the location and/or orientation of equipment monitoring components 120-124 can be included within a set of configuration information associated with the equipment monitoring components 120-124.

Obtaining equipment monitoring component 120-124 configuration information apart from that obtained from scanning a code associated with the particular equipment monitoring component 120-124, is referred to herein as direct (non-scanning) identification of configuration information via the code scanning device 140. Via direct identification, configuration parameters that are not encoded within a machine readable code, are obtained via human eye observation or via other functions of the code scanning device 140, such as configuration parameters that are measured via image recognition and/or other code reading device 140 sensors, such as for example, equipment measurement component 120-124 orientation as seen through a viewing image provided by the code scanning device 140.

Other non-scanning configuration associated with the particular equipment monitoring component 120-124 may simply be observed and entered by the user into the code scanning device 140. This type of configuration information, such as for example, the scale factor, orientation, type of output and full scale range of an equipment monitoring component 120-124 is communicated within a set of communication information for the particular equipment monitoring component 120-124 to other destinations for processing and/or storage.

In some exemplary embodiments, the set of equipment monitoring components 120 is designed to monitor vibration of equipment, such as a turbine 110. For example, in some exemplary embodiments, the monitoring components can be implemented as 3300 XL sensor apparatus, also referred to herein as the 3300 XL vibration apparatus, that is supplied by the General Electric Company of Bently, Nev. The 3300 XL apparatus includes a transmitter 120, an extension cable 122, and a proximity probe 124. The extension cable 122 can be designed at different lengths (e.g., as a 5 meter model or a 9 meter model version).

In some exemplary embodiments, the monitoring apparatus 130 is implemented as a 3500 Series condition monitoring and protection system, also referred to as an asset condition monitor, that is also supplied by the General Electric Company. Within this monitoring apparatus 130 there are card slots to receive various types of monitoring modules that are each implemented as electronic cards. In some exemplary embodiments, the monitoring apparatus 130 includes a 3500/42 Vibration Monitor having (4) channels. One of these 4 channels would receive the cable 128 that would be attached to the transmitter 120.

Figure 2:
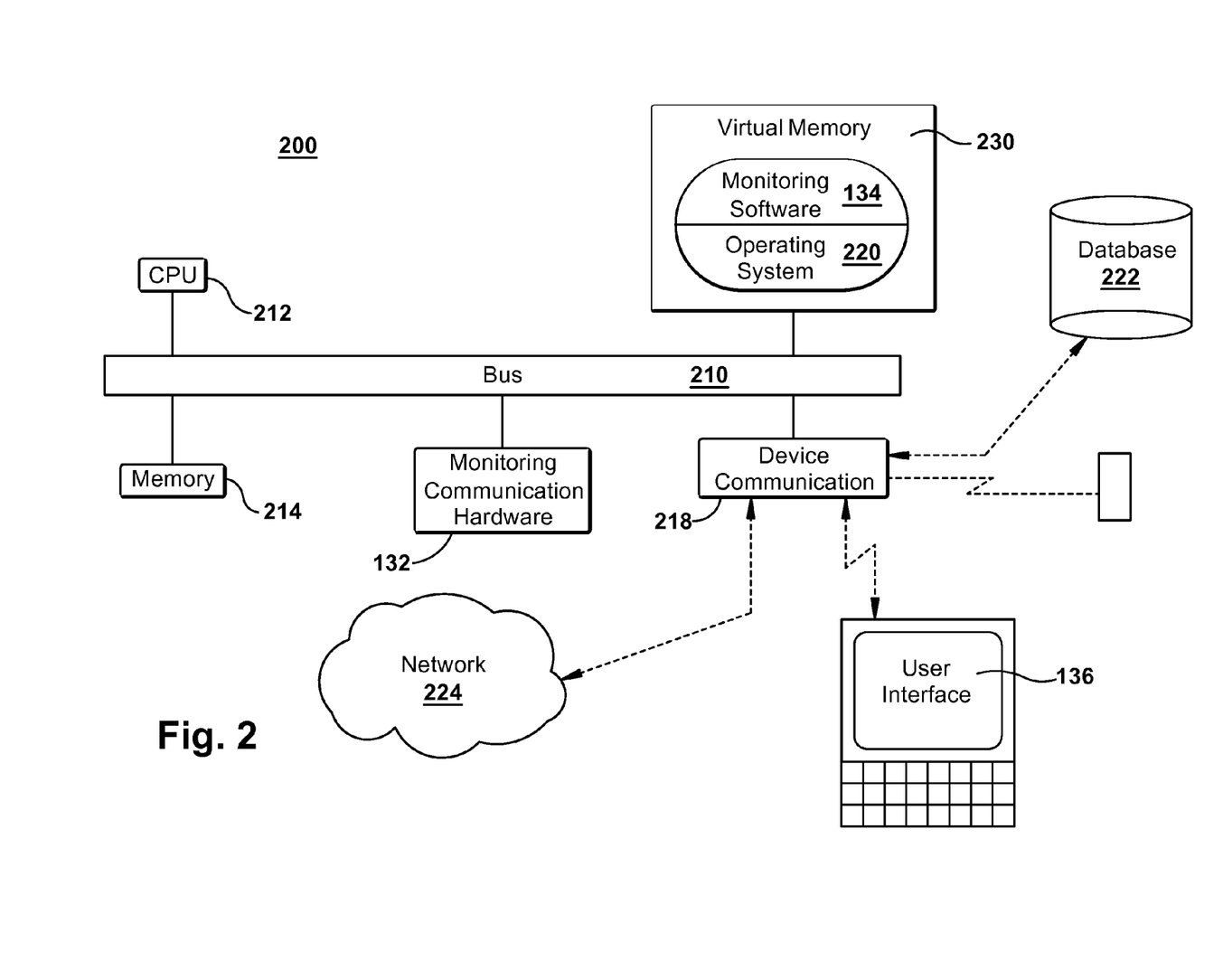
FIG. 2 is a diagram of computing hardware within the monitoring apparatus of FIG. 1.

FIG. 2 is a diagram of computing hardware 200 within the monitoring apparatus of FIG. 1. In this exemplary embodiment, the monitoring software 134 is implemented as a computer software application executing on computer hardware included within the monitoring apparatus 130. The monitoring software 134 can be configured to inter-operate with an operating system 220, such as for example, a Microsoft or UNIX operating system, via the operating system application programming interface (API). The monitoring software 134 directs operations of a central processing unit (CPU) 212 that is electronically accessible via a system bus 210 residing within the architecture of the monitoring apparatus 130. Alternatively, the monitoring software 134 can be programmed onto other operating systems and/or computing platforms, such as for example, programmed onto variants of UNIX, such as Linux or onto other Microsoft supplied operating systems, various IBM, real-time, or other Microsoft supplied operating systems. The operating system 220 can be designed to manage physical memory 214 as virtual memory 230 within which the monitoring software 134 and operating system software 220 reside.

Monitoring communication hardware 132 is electronically attached to system bus 210 and attached to a cable 128 (See FIG. 1) that enables communication with the equipment monitoring components 120-124. The monitoring hardware 132 is accessible from the CPU 212 and the monitoring software 134 via the system bus 210 and is available for the monitoring software 134 to interface with the monitoring communication hardware 132 while in communication with the equipment monitoring components 120-124.

User interface hardware 136 is also accessible from the CPU 212 and the monitoring software 134 via the system bus 210 and device communication hardware 218 and is available for the monitoring software 134 to direct interaction with a user. The device communication hardware 218 interfaces with hardware of a data repository 222 and of the user interface hardware 136.

Optionally, the monitoring apparatus 130 can also interface with one or more computer networks 224 via the communication input/output hardware 218. The computer networks 224 can be implemented as a set of local and/or a wide area networks, such as including the Internet. The networks can support wireless communication with various other devices, including hand held devices and/or the equipment monitoring components 120-124. With such a network communication embodiment, a direct cable connection, such as cable 128, may be redundant or un-necessary in addition to wireless communication. Such networks may enable the equipment monitoring components to be located far away from the location of the network monitoring apparatus.

Referring back to FIG. 1, in a typical system 100, equipment monitoring components 120-124 physically and electrically attach to each other and are disposed proximate to the turbine 110. The equipment monitoring components 120-124 are attached to a first end of an electrical signal carrying cable 128 and the monitoring apparatus 130 is connected to an opposite and second end of the cable 128.

In the above described system 100, the equipment monitoring components 120-124 are installed prior to being fully configured to communicate with the monitoring apparatus 130. In a typical system, a user walks to within proximity of the equipment (e.g., a turbine 110) and employs a code scanning device 140 to automate configuration of the installed equipment monitoring components 120-124. In one embodiment, the code scanning device 140 is also an image capture device.

The code scanning device 140 is used to capture visual information associated with each equipment monitoring component 120-124. Such visual information is processed by the code scanning device 140 to identify and decode unique codes that are associated with each component and to obtain configuration information regarding the equipment monitoring component 120-124 that is associated with each code. The visual information can also include for example, other information regarding component orientation and/or location which may not be obtained in association with scanning each respective code. Such configuration information can be obtained directly by the code scanning device 140 or by the user via the code scanning device 140 or by the user via observation and automatically communicated into the monitoring apparatus 130 without the user having to travel to the monitoring apparatus 130.

Figure 3:
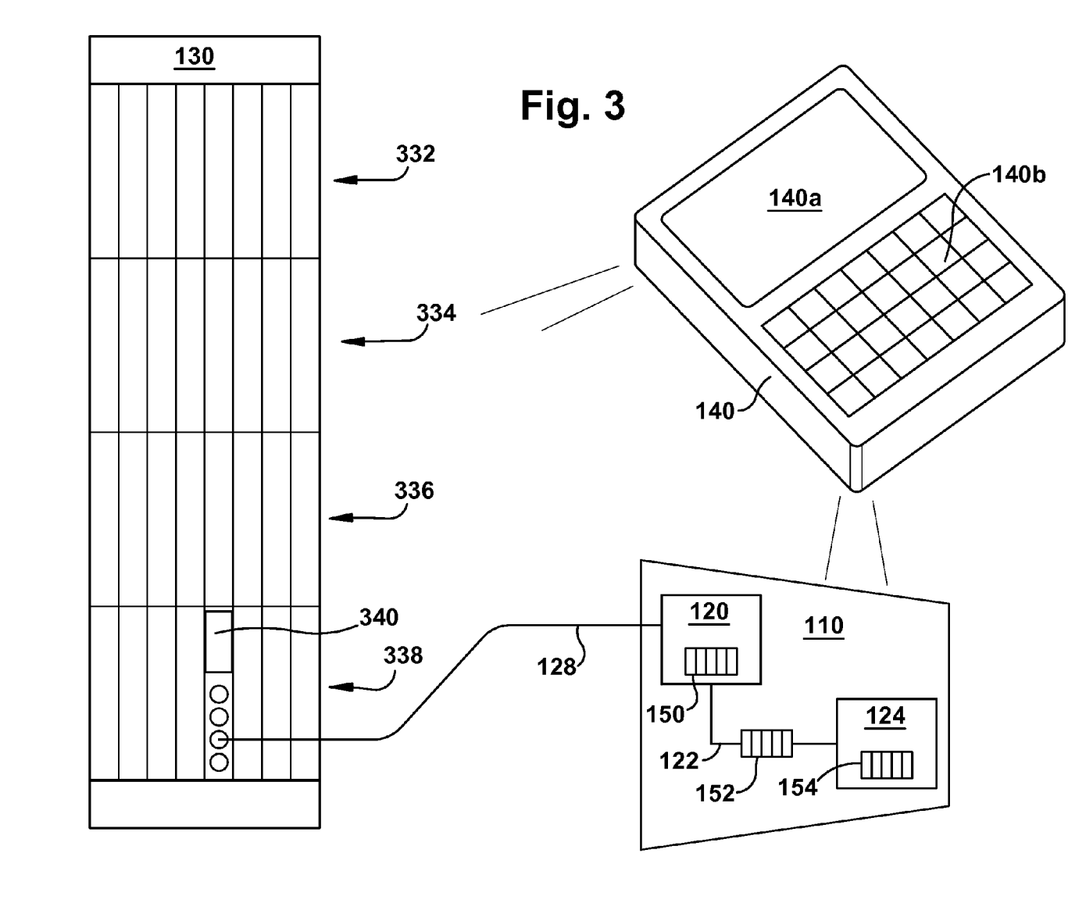
FIG. 3 is a diagram of a scanning device that is employed by a user to automatically configure communication between a set of equipment monitoring components and a monitoring apparatus.

FIG. 3 is a diagram of a code scanning device 140 that is employed by a user to automatically configure communication between the set of equipment monitoring components 120-124 and the monitoring apparatus 130, as previously described. As shown, the code scanning device 140 includes a user interface display screen 140a and navigation and text entry keyboard 140b. In some exemplary embodiments, the code scanning device 140 is implemented as a bar code scanner that has wireless communication capabilities, such as in accordance with 802.11 to other wireless network nodes. In other exemplary embodiments, the code scanning device 140 is a mobile telephone having a camera, which is known as a smart phone with image capture and viewing capability, and which provides wireless communication capabilities.

The internals of the code scanning device 140 are similar to that of FIG. 2, in that the code scanning device 140 will include a processor (central processing unit), virtual 230 and/or physical memory 214, at least one system bus and application software. The application software is designed to direct code scanning device hardware to scan and decode a machine readable code 150-154 and to communicate with a repository 222 via repository software 138 and communicate with the monitoring communication hardware 132 via the monitoring software 134. The application software interfaces with operating software also residing within memory 230, like that shown with respect to the interface between the monitoring software 134 and the operating system software 220 of FIG. 2. The application and operating system software include procedures that facilitate code mapping and monitoring configuration and any communication required for code mapping and monitoring configuration.

In some embodiments, code mapping is performed via a repository located within the code mapping device 140 itself. In some embodiments, the code mapping device 140 is wire line, such as via a docking station, and in communication with other devices for communication with a repository and/or a monitoring system.

The monitoring apparatus 130 is shown as a set of racks 332-338 that each include (8) card slots for storage of various card types. A card 340 of rack 338 is designed to process signals transmitted from equipment monitoring component 120-124 via cable 128. The card 340 includes (4) channels arranged in a vertical line. The cable 128 is attached to channel number 3 which is the third top most channel.

Referring back to FIG. 1, in the typical system 100, equipment monitoring components 120-124 are physically and/or electrically attached with each other and disposed onto the outer surface of the turbine 110. The equipment monitoring components 120-124 are connected to a first end of an electrical signal carrying cable 128, and that has a second end that is connected to the monitoring apparatus 130. In the above described system 100, the components are installed prior to being fully configured to communicate with the monitoring apparatus 130.

Further, a user can walk to within viewing proximity of the turbine 110 and then capture or analyze an image of each of one or more installed component(s) via a code scanning device 140. The code scanning device 140 is designed to process each captured image and to locate and identify a code within the captured image. Upon identification of each code, the code scanning device 140 determines a numerical value represented by the code. The code scanning device 140 initiates a mapping operation upon the numerical value of the code to a set of configuration information associated with the code representing the component.

In one exemplary embodiment, the code scanning device 140 performs the mapping operation by transmitting a wireless communication that includes the numerical value of the code to repository software 138, which accesses a repository 222 of code and configuration information. The repository 222 stores information encoding an association between a code representing an equipment monitoring component 120-124, and configuration information that is associated with the code representing the equipment monitoring component 120-124. In response, the repository software 138 transmits a communication to the code scanning device 140 including the configuration information that is associated with the code representing the component. The above described mechanism, which employs the repository software 138, the repository 222 and a communication capability for interfacing with the code scanning device 140, can be referred to as a code mapping facilitator.

The configuration information is designed to encode a set of one or more configuration parameters that are each named and set to equal a default parameter value. Some of the configuration parameters may be set to default values that are fixed, while other configuration parameters may be set to default values that are not-fixed and are appropriate to be reset by the user.

In such a use, the software within the code scanning device 140 lists configuration parameters by name and value and prompts the user to optionally set or reset a non-fixed value of one or more named configuration parameter(s) associated with each scanned component, via user interface display screen 140*a*. The user may or may not elect to modify the value of some or all of the non-fixed configuration parameter(s) listed by the code scanning device 140. In this described circumstance, the listed configuration parameters are associated with the one scanned equipment monitoring component 120-124.

For example, an equipment monitoring component 120-124 may include external and hand settable switches. The user has the option to set a switch position and to set a corresponding non-fixed parameter in association with that equipment monitoring component 120-124. In some exemplary embodiments, the user can also modify and essentially override a fixed configuration parameter value associated with the equipment monitoring component 120-124.

After viewing the listed parameter names and values and approving the fixed or non-fixed values of the configuration parameters, the user enters a command to the code scanning device 140 to transmit the configuration information to the monitoring apparatus 130 for processing of configuration information in association with an identified rack and card slot and channel of the monitoring apparatus 130 for which the equipment monitoring component is to communicate. In response, the monitoring apparatus 130 processes the received configuration information to generate a configuration file that is loaded into and processed by the monitoring apparatus 130 to direct operation of the identified rack, card slot and channel of the monitoring apparatus 130, when communicating with equipment monitoring components 120-124 via cable 128. The above described mechanism, which processes configuration information in association with an identified rack and card slot and channel of the monitoring apparatus 130 for which the equipment monitoring component is to communicate, can be referred to as a monitoring configuration facilitator.

In the circumstance where there are multiple equipment monitoring components 120-124, such as that shown in FIG. 1, each of the multiple machine readable codes for each respective equipment monitoring component 120-124, are scanned, mapped and a resulting set of per component configuration information for each scanned code is consolidated or aggregated into one combined set of configuration information. The combined set of configuration information is transmitted to the monitoring apparatus 130 for configuration processing in association with a rack and card slot and channel identifier. In response, the monitoring apparatus 130 processes the configuration information to generate a configuration file that is loaded into and processed by the monitoring apparatus 130 to direct operation of the identified rack/slot and channel of the monitoring apparatus 130 when communicating with the multiple equipment monitoring components 120-124.

In some exemplary embodiments, the code scanning device 140 is designed so that the user enters a command to execute a cross checking procedure for the combined set of configuration information. This cross checking command determines compatibility between pairs of per component configuration information that are each associated with selected pairs of components. Pairs of components that are determined to be incompatible with each other, in any configuration, or incompatible with each other as currently configured, are identified by the code scanning device 140 to the user.

If no incompatibility between configured components is identified by the cross checking procedure, such a result is indicated to the user. The user enters a command to the code scanning device 140 to transmit the cross-checked configuration information to the monitoring apparatus 130 for configuration processing in association with a rack and card slot and channel identifier. In response, the monitoring apparatus 130 processes the configuration information to generate a configuration file that is loaded and processed to direct operation of the identified rack/slot and channel of the monitoring apparatus 130 when it is communicating with the multiple equipment monitoring components 120-124.

Figure 4:
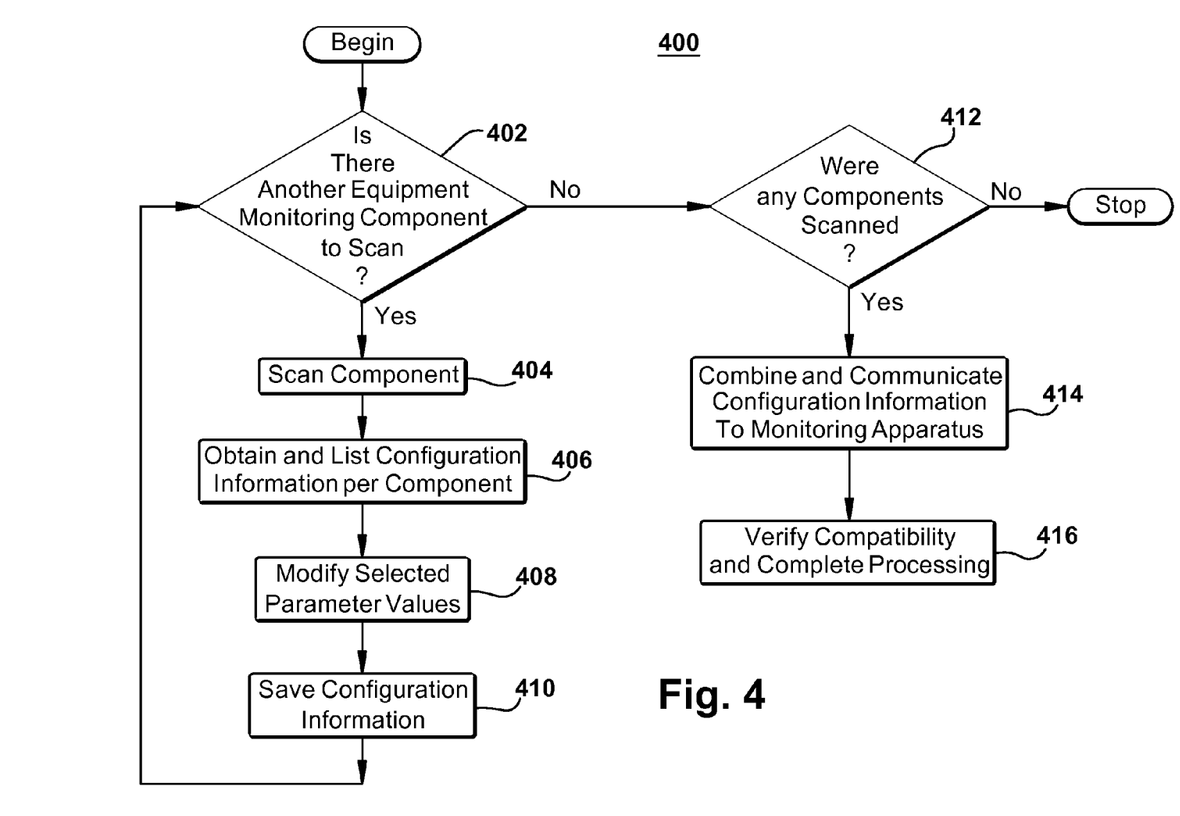
FIG. 4 is a flow diagram of an embodiment of a procedure for employing the scanning device for equipment monitoring component configuration.

FIG. 4 is a flow diagram of an exemplary embodiment of a procedure for employing the code scanning device 140 for equipment monitoring component configuration. As shown, a first step 402 asks whether there is any or another, equipment monitoring component 120-124 that is available to be scanned. If yes, then the equipment monitoring component is scanned 404. Next, scanned component configuration information is obtained and listed by the code scanning device 140 in association with the scanned code 406.

Next, the user reads the listed configuration parameters for the scanned component and determines if a configuration parameter value of a scanned component should be modified. In some exemplary embodiments, the software is designed to highlight configuration parameter values of the configuration information associated with the scanned code, that do not have an associated fixed value based upon the type of particular equipment monitoring component 120-124 scanned. For example, an equipment monitoring component 120-124 may have one or more user selectable switches each having a position that can be manipulated by the user. The user has an option to modify a configuration value parameter in accordance with the position of such a switch (step 408). Next, whether a configuration parameter has been modified or not, the per component configuration information is saved (step 410) by entering a command into the code scanning device 140.

Next, the procedure returns to step 402 to ask whether there is any remaining equipment monitoring components 120-124 to be scanned. If yes, performance of steps 404-410 are repeated for another equipment monitoring component 120-124. If no remaining equipment monitoring components 120-124 are available to be scanned, then go to step 412 to ask if at least one component was scanned? If yes, then go to step 414 to combine and communicate component configuration information to the monitoring apparatus 130 for compatibility cross-checking between selected pairs of individually scanned and configured equipment monitoring components 120-124. The monitoring apparatus 130 then communicates a reply back to the code scanning device 140 acknowledging receiving and processing the prior communication from the code scanning device 140 and reporting results of processing the prior communication from the code scanning device 140. Next, the user verifies that the combined configuration information has passed compatibility cross-checking checks and lacks compatibility errors and successfully completes processing to use by the monitoring apparatus 130 (step 416).

In some exemplary embodiments, the user optionally employs the code scanning device 140 to scan a machine readable code disposed on a selected monitoring card residing within a particular rack and card slot within the monitoring apparatus 130 that is to communicate with the equipment monitoring components 120-124. The scanned code is mapped to a set per component configuration information, where in this instance, the scanned component is the selected monitoring card. In this exemplary embodiment, compatibility between the selected monitoring card and one or more other equipment monitoring components 120-124 can be determined via the cross checking procedure.

Furthermore, in some exemplary embodiments, per component configuration information obtained for the selected monitoring card, is employed by the mapping procedure to revise per component configuration information associated with other equipment monitoring component(s) that are expected and being configured to communicate with the selected monitoring card.

For example, the selected monitoring card may be designed to support programmable alarm set points with respect to the operation of a particular equipment monitoring component 120-124. In this circumstance, such an alarm set point can be set or reset by the user as a non-fixed configuration parameter value associated with a selected equipment monitoring component 120-124 for which the alarm set point is to be applied.

In another circumstance, the selected monitoring card may not be designed to support programmable alarm set points with respect to the operation of a particular equipment monitoring component 120-124. In this circumstance, such an alarm set point is unavailable to be set by the user as a configuration parameter associated with a selected equipment monitoring component 120-124, when that component is configured to communicate with the selected monitoring card lacking such a design. As a result, scanning the machine readable code disposed on a selected monitoring card which lacks such an alarm set point feature, would not cause an alarm set point configuration parameter to be added to the per component configuration data associated with the selected equipment monitoring component 120-124.

After the combined set of configuration information is transmitted to and processed by the monitoring apparatus 130, the monitoring apparatus 130 is configured to monitor the operation of the one or more configured equipment monitoring components 120-124.

In some exemplary embodiments, referred to as loop checking, during a period of monitoring of the operation of the equipment monitoring components 120-124, the code scanning device 140 upon entry of a command, remotely communicates with and obtains information from the monitoring apparatus 130 regarding the operating status of the equipment monitoring components 120-124. For example, if the components are communicating with channel number 3 of monitoring card residing within slot 340 of the monitoring apparatus 130 (See FIG. 3), the user can obtain an information transmitted from equipment monitoring component 120 that is communicating with that channel, card within that slot 340. Also, system performance can be monitored and verified via entry of a command after completion of loop checks and final installation setup.

For example, if the equipment monitoring components 120-124 comprise an eddy current type of sensor, the information transmitted could indicate the value of a gap voltage that is measured by the equipment monitoring component 120-124. If the gap voltage is suspiciously low or high, the user can move to the location of the equipment monitoring components 120-124 to take further action, such as to adjust an eddy probe gap to measure a corresponding change in the bias voltage, in order to verify that the equipment monitoring components 120-124 are operating properly, or to verify that the equipment monitoring components 120-124 are in fact correctly wired to the channel 3 of slot 340. If not, then the cable 128 may be incorrectly wired to another channel and/or slot than was intended by the user.

In some embodiments, software that directs hardware within a code scanning device performs scanning a representation of a machine readable code that is associated with at least one equipment monitoring component via a code scanning device, and performs obtaining a set of configuration information that is associated with the machine readable code via communication with a repository of configuration information, and performs communicating the set of configuration information to a monitoring apparatus that is designed to communicate with the at least one of the components while monitoring the selected equipment, to yield a technical effect of configuring a communications interface between a monitoring apparatus and one or more components that are designed to physically and/or electrically interface with each other. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for configuring a communications interface between a monitoring apparatus and one or more equipment monitoring component(s), each configured to monitor the operation of selected equipment and having a unique associated machine readable code, the system comprising:
    a code scanning device that is configured to input a visual representation of the machine readable code associated with one of the equipment monitoring component(s), and to map the input visual representation to at least one numerical value;
    a code mapping facilitator that is configured to map the at least one numerical value to an associated set of configuration information for the one of the equipment monitoring component(s); and
    a monitoring configuration facilitator that is configured to communicate the associated set of configuration information to the monitoring apparatus that is communicatively connected with the one of the equipment monitoring component(s).

2. The system of claim 1 wherein the code scanning device is a smart phone or bar code scanner.

3. The system of claim 1 wherein communication between the code scanning device and the code mapping facilitator is via wireless communication.

4. The system of claim 1 wherein communication between the code scanning device and the monitoring configuration facilitator is via wireless communication.

5. A method for configuring a communications interface with one or more equipment monitoring component(s) that are designed to physically and/or electrically interface with each other, each of the equipment monitoring component(s) having a unique associated machine readable code and each having associated component configuration information associated with the machine readable code, the method comprising the steps of:
    scanning a visual representation of the machine readable code that is associated with at least one of the equipment monitoring component(s), wherein the at least one of the equipment monitoring component(s) is configured to monitor selected equipment;
    obtaining at least a portion of the component configuration information associated with the machine readable code; and communicating the obtained component configuration information to a monitoring apparatus that is communicatively connected with the at least one of the equipment monitoring component(s).

6. The method of claim 5, wherein the scanning step is performed with a code scanning device that communicates with the monitoring apparatus.

7. The method of claim 6, wherein the code scanning device is a smart phone or a bar code scanner.

8. The method of claim 6, wherein an orientation or location of at least one of the equipment monitoring components is obtained via non-scanning features of the code scanning device.

9. The method of claim 5, wherein the at least one of the equipment monitoring component(s) is configured to function as a sensor for monitoring selected equipment.

10. The method of claim 5, wherein the obtaining step is performed via communication with a repository of information storing at least a portion of the component configuration information that is associated with the respective machine readable code(s) of each of the equipment monitoring component(s).

11. The method of claim 5, wherein the obtaining step is performed via interpreting information that is embedded within the respective machine readable code(s) of each of the equipment monitoring component(s).

12. The method of claim 5, further including repeating the scanning and obtaining steps for each of a plurality of machine readable codes for respective ones of the equipment monitoring component(s), the method further including aggregating, into an combined set of configuration information that is stored into a configuration file, respective portions of the respective component configuration information associated with each of the machine readable codes.

13. The method of claim 12, further including cross checking combined set of configuration information for compatibility between selected pairs of machine readable codes included within the combined set.

14. The method of claim 5, wherein the component configuration information includes a set of one or more configuration parameters that are each set to equal a parameter value.

15. The method of claim 14 wherein at least some of the configuration parameters are set to default values that are fixed.

16. The method of claim 14, wherein at least some of the configuration parameters are set to default values that are non-fixed and that are reset to other values.

17. The method of claim 16, including prompting by a code scanning device for entry of a value for at least one non-fixed parameter.

18. The method of claim 16, further comprising a step of communicating one or more parameter value(s) to the monitoring apparatus after the obtaining step and prior to the communicating configuration data step.

19. The method of claim 5 further comprising a step of scanning a code that is associated with a monitoring apparatus card.

20. A method for configuring a communications interface with one or more equipment monitoring component(s) that are designed to physically and/or electrically interface with each other, each of the equipment monitoring component(s) having a unique associated machine readable code and each having associated component configuration information associated with the machine readable code, the method comprising the steps of:
  scanning a visual representation of a machine readable code that is associated with at least one of the equipment monitoring component(s) via a code scanning device, wherein the equipment monitoring component(s) collectively function as a system for monitoring selected equipment;
  obtaining the component configuration information that is associated with the machine readable code via communication with a repository of configuration information; and
  communicating the obtained component configuration information to a monitoring apparatus that is communicatively connected with the at least one of the equipment monitoring component(s) while monitoring the selected equipment.

21. The system of claim 1, further including the monitoring apparatus that is communicatively connected with the one of the equipment monitoring component(s) to receive monitoring information different from the configuration information regarding the operation of the selected equipment.

22. The system of claim 1, wherein at least one of the equipment monitoring component(s) includes a sensor.

* * * * *

UNITED STATES PATENT AND TRADEMARK OFFICE
CERTIFICATE OF CORRECTION

PATENT NO. : 8,870,057 B2
APPLICATION NO. : 13/240544
DATED : October 28, 2014
INVENTOR(S) : Lam Arthur Campbell et al.

It is certified that error appears in the above-identified patent and that said Letters Patent is hereby corrected as shown below:

In the Claims

An error has been found in Col. 13, line 36. Please change to the following:

The method of claim 12, further including cross checking <u>the</u> combined set of configuration information for compatibility between selected pairs of machine readable codes included within the combined set.

An error has been found in Col. 14, line 4. Please change to the following

The method of claim 16, <u>further</u> including prompting by a code scanning device for entry of a value for at least one non-fixed parameter.

Signed and Sealed this
Twenty-fourth Day of February, 2015

Michelle K. Lee
*Deputy Director of the United States Patent and Trademark Office*